United States Patent
Watson et al.

(10) Patent No.: US 6,352,680 B1
(45) Date of Patent: Mar. 5, 2002

(54) PARTIAL COMBUSTION OF HYDROGEN SULPHIDE

(75) Inventors: Richard William Watson, Guildford; Stephen Rhys Graville, Sheffield; John Allen Wainford, South Norwood, all of (GB)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 09/337,765

(22) Filed: Jun. 22, 1999

(30) Foreign Application Priority Data

Jun. 29, 1998 (GB) ............................................. 9814064

(51) Int. Cl.$^7$ .......................... B01D 53/58; C01B 17/04
(52) U.S. Cl. ................... 423/573.1; 423/237; 423/576.8
(58) Field of Search ........................... 423/573.1, 576.8, 423/237, 224, 220

(56) References Cited

U.S. PATENT DOCUMENTS

| | | | | |
|---|---|---|---|---|
| 3,661,507 A | * | 5/1972 | Breitbach et al. | .............. 23/2 R |
| 4,035,158 A | | 7/1977 | Scott et al. | ..................... 23/278 |
| 4,391,790 A | * | 7/1983 | Palm et al. | .............. 423/574 R |
| 4,596,699 A | * | 6/1986 | Desgrandchamps et al. | ..... 422/160 |
| 4,643,888 A | * | 2/1987 | Palm | ..................... 423/574 R |
| 4,933,163 A | * | 6/1990 | Fischer et al. | ........... 423/574 R |
| 5,028,409 A | | 7/1991 | Gitman | .................... 423/574 R |

FOREIGN PATENT DOCUMENTS

| | | | | |
|---|---|---|---|---|
| DE | 33 35 931 A1 | * | 4/1985 | .............. 423/576.8 |
| DE | DE 34 30 015 C1 | | 5/1986 | |
| DE | 37 35 002 A1 | * | 4/1989 | .............. 423/576.8 |
| DE | 274 808 A1 | * | 1/1990 | .................. 423/224 |
| DE | 274 809 A1 | * | 1/1990 | .............. 423/576.8 |
| EP | 0 315 225 A1 | * | 5/1989 | |
| EP | EP 0 486 285 A2 | | 5/1992 | |
| WO | WO 96/26157 | * | 8/1996 | |

OTHER PUBLICATIONS

"Leading Burner Designs for Sulphur Plants", *Sulphur*, GB, The British Sulphur Co., London, No. 224, Jan. 1, 1993, pp. 23–28, 30–34.

* cited by examiner

Primary Examiner—Steven P. Griffin
Assistant Examiner—Timothy C Vanoy
(74) Attorney, Agent, or Firm—Philip H. Von Neida; Salvatore P. Pace (57) ABSTRACT

Sulfur vapor is formed by partial oxidation of hydrogen sulphide. A burner is operated so as to establish a flame in a furnace in or into which the burner fires. There is supplied to the flame from the first region of the mouth of the burner at least one flow of a first combustible gas comprising hydrogen sulfide. At least one second flow of a first oxidizing gas is caused to issue from the mouth of the burner and mix in the flame with the first combustible gas. There is supplied to the flame from a second region of the mouth of the burner surrounding and spaced from the said first region at least one third flow of a second combustible gas comprising hydrogen sulfide. At least one fourth flow of a second oxidizing gas is caused to issue from a region or regions of the mouth of the burner surrounded by said second region and mix in the flame with the second combustible gas. At least one fifth, outermost flow of a third oxidizing gas is caused to mix in the flame with the second combustible gas. A resultant gas mixture including sulfur vapor, water vapor, sulfur dioxide, hydrogen and residual hydrogen sulfide is withdrawn from the furnace.

10 Claims, 8 Drawing Sheets

PARTIAL COMBUSTION OF HYDROGEN SULPHIDE

BACKGROUND OF THE INVENTION

This invention relates to the partial oxidation (partial combustion) of hydrogen sulphide and in particular to a method of and apparatus for forming sulphur vapour by partial oxidation of hydrogen sulphide.

Hydrogen sulphide containing gas streams (sometimes referred to as "acid gas streams") are typically formed in oil refineries and natural gas processing units. Such streams cannot be vented directly to the atmosphere because hydrogen sulphide is poisonous. A conventional method of treating a hydrogen sulphide containing gas stream (which, if desired, has been pre-concentrated) is by the Claus process. In this process a part of the hydrogen sulphide content of the gas stream is subjected to combustion in a furnace so as to form sulphur dioxide. The sulphur dioxide then reacts in the furnace with residual hydrogen sulphide so as to form sulphur vapour. Thus, the hydrogen sulphide is effectively partially oxidised. The reaction between hydrogen sulphide and sulphur dioxide does not go to completion. The effluent gas stream from the furnace is cooled and sulphur is extracted, typically by condensation, from the cooled effluent gas stream. The resulting gas stream, still containing residual hydrogen sulphide and sulphur dioxide, passes through a train of stages in which catalysed reaction between the residual hydrogen sulphide and the sulphur dioxide takes place. Resulting sulphur vapor is extracted downstream of each stage. The effluent gas from the most downstream of the sulphur extractions may be incinerated or subjected to further treatment, e.g. by the SCOT or Beavon process, in order to form a gas stream which can be vented safely to the atmosphere.

Most Claus plants are equipped with right cylindrical furnaces having a length to internal diameter ratio in the range of from 2:1 to 4:1. The furnaces may be cross-fired or tangentially-fired by a burner or burners mounted at the side. Cross or tangentially fired burners achieve good mixing of the reacting chemical species. If desired, mixing can be enhanced by providing the furnace with baffles or checkerwork walls.

Air may be used to support the combustion of hydrogen sulphide in the initial part of the process. The stoichiometry of the reactions that take place is such that relatively large volumes of nitrogen (which is, of course, present in the air that supports the combustion) flow through the process and therefore place a ceiling on the rate at which the gas stream containing hydrogen sulphide can be treated in a furnace of given size. This ceiling can be raised by using commercially pure oxygen or oxygen-enriched air to support the combustion of the hydrogen sulphide.

If commercially pure oxygen or oxygen-enriched air having a mole fraction of oxygen above 0.65 is used to support the combustion of the hydrogen sulphide there is a relatively high risk of damage to the refractory lining of the furnace being created by the resulting increase in flame temperature depending on the composition of the Claus feed gas. There are a number of proposals in the art to solve this problem. Some proposals involve introduction of flame moderators such as water into the furnace; others involve recycling to the furnace gas from a downstream part of the plant so as to moderate the temperature in the furnace; and yet others employ a plurality of furnaces so as to limit the amount of combustion that is performed in each individual furnace, thereby obviating the need for an external flame moderator or to recycle gas from a downstream part of the plant. All these proposals, however, add to the complexity of the plant.

Axially or longitudinally fired burners mounted on the back wall may be used instead of cross or tangentially fired burners in Claus furnaces. Such axially or longitudinally fired burners can be designed to provide average residence times comparable with those of cross—or tangentially—fired burners at a specified throughput, and may be preferred at higher levels of oxygen-enrichment.

The use of such an axially or longitudinally fired burner is disclosed in European patent application 0 315 225 A, in which there is a central pipe for oxygen, at least one second pipe for hydrogen sulphide containing feed gas which coaxially surrounds the central pipe, and an external coaxial pipe for air. The burner is used when the hydrogen sulphide feed gas contains at least 5% by volume of carbon dioxide or hydrocarbons. The oxygen velocity at the outlet of the burner is in the range of from 50 to 250 metres per second (typically 150 metres per second) and the corresponding feed gas velocity is in the range of 10 to 30 metres per second. Temperatures in the range of 2000 to 3000° C. are generated in the core of the burner flame, and a gas mixture having a temperature in the range of 1350 to 1650° C. leaves the furnace. This gas mixture contains at least 2% by volume of carbon monoxide and at least 8% by volume of hydrogen.

During normal operation of, for example, an oil refinery the rate at which hydrogen sulphide containing gas streams are produced for treatment by the Claus process is not constant and can vary quite widely. It is therefore desirable that the furnace be capable of effective operation over a wide range of different rates of inflow of the hydrogen sulphide containing gas.

WO-A-96/26157 also discloses the use of an axially or longitudinally fired burner in the Claus process. Generally parallel flows of a first gas containing hydrogen sulphide and a second gas enriched in oxygen are supplied to the tip (i.e. mouth) of the burner. The ratio of the velocity of the first gas to the velocity of the second gas is selected so as to be in the range of 0.8:1 to 1.2:1.

Neither EP-A-0 315 225 A nor WO-A-96/26157 discusses the problem of how to handle a wide range of different rates of inflow of the hydrogen sulphide containing gas. In fact, neither discloses a method which is capable of effective operation if the rate of supply of the feed gas containing hydrogen sulphide varies considerably.

The method and apparatus according to the invention have it as aim to address this problem and to provide a solution superior to any possible when the disclosure of EP-A-0315 255 or WO-A-96/26157 is followed.

SUMMARY OF THE INVENTION

It is the primary object of the present invention to provide a method of forming sulphur by the partial oxidation of hydrogen sulphide.

According to the present invention there is provided a method of forming sulphur vapor by partial oxidation of hydrogen sulphide, comprising operating a burner so as to establish a flame having at least three stages in a furnace in or into which the burner fires, supplying to the flame from a first region of the mouth of the burner at least one flow of a first combustible gas comprising hydrogen sulphide, causing at least one second flow of a first oxidizing gas to issue from the mouth of the burner and mix in the flame with the first combustible gas, supplying to the flame from a second region of the mouth of the burner surrounding and spaced from said first region at least one third flow of a second combustible gas comprising hydrogen sulphide, causing at least one fourth flow of a second oxidizing gas to issue from a region or regions of the mouth of the burner surrounded by said second region and mix in the flame with the second combustible gas, causing at least one fifth, outermost, flow of a third oxidizing gas to mix in the flame with the second combustible gas, and withdrawing from the furnace a resultant gas mixture including sulphur vapor, water vapor, sulphur dioxide, hydrogen and residual hydrogen sulphide.

The invention also provides apparatus for forming sulphur vapor by partial oxidation of hydrogen sulphide, comprising a furnace, a port in the furnace, a burner having its mouth located in the port and operable to establish a flame having at least three stages in the furnace, and an outlet from the furnace for a resultant gas mixture including sulphur vapor, water vapor, sulphur dioxide, and residual hydrogen sulphide to exit the furnace; wherein the mouth of the burner has a first outlet or group of outlets for supplying to the flame at least one first flow of a first combustible gas comprising hydrogen sulphide, a second outlet or group of outlets for causing at least one second flow of a first oxidizing gas to issue from the burner and mix in the flame with the first combustible gas, a third outlet or group of outlets, surrounding and spaced apart from the first outlet or group of outlets, for supplying to the flame at least one third flow of a second combustible gas comprising hydrogen sulphide, and a fourth outlet or group of outlets surrounded by said third outlet or group of outlets for causing at least one fourth flow of a second oxidizing gas to issue from the burner and mix in the flame with the second combustible gas; wherein a passage or passages are defined between the burner and the port, or extend through or terminate in the mouth of the burner, and are able to cause an outermost fifth flow of a third oxidizing gas to mix in the flame with the second combustible gas.

Burning the hydrogen sulphide in three stages, namely an innermost stage, an outermost stage, and an intermediate stage, makes it possible to handle effectively a wider range of different rates of inflow of the hydrogen sulphide containing gas than if one or two such stages are employed. Other advantages accrue from such staging of the combustion. In particular, a relatively low temperature can be maintained in the outermost stage even though a temperature in excess of 2000° C. may be created in innermost stage, and therefore risk of damage to any refractory lining of the furnace can be kept to acceptable levels. A high temperature, that is a temperature well in excess of 2000° C., is particularly advantageous because it facilitates destruction of any ammonia in the first combustible gas and creation of conditions which increase the proportion of the resulting sulphur vapor that is formed directly by thermal cracking of hydrogen sulphide rather than by the indirect route involving oxidation of some hydrogen sulphide or sulphur to sulphur dioxide and then reaction of the thus formed sulphur dioxide with residual hydrogen sulphide. Destruction of ammonia is desirable because this gas tends to affect adversely downstream processing of the effluent from the furnace in catalytic reactors in which hydrogen sulphide and sulphur dioxide react together to form further sulphur vapor, the ammonia acting to block the catalyst by formation of ammonium salts. Moreover, the ammonia can be destroyed in the flame without resort to a combustion zone and a reaction zone separate from one another with some of the amine gas by-passed directly to the reaction zone. By avoiding the need to by-pass amine gas around the combustion zone even when using air for combustion, the ability of the burner to handle effectively a wide range of different flow rates of feed gases is enhanced due to a more effective use of its turndown range. In addition, forming sulphur vapor by thermal cracking reduces the rate at which oxygen-enriched air needs to be supplied to the burner to achieve a given recovery of sulphur vapor from the furnace, provided the furnace gases are cooled effectively downstream of the furnace.

Preferably the flame extends generally longitudinally within the furnace. The furnace is typically disposed with its longitudinal axis horizontal, and therefore the burner is typically also disposed with its longitudinal axis horizontal. Such arrangements can help to keep down the risk of damage to any refractory lining employed in the furnace.

The first and second oxidizing gases preferably have a mole fraction of at least 0.22 and may be oxygen-enriched air or pure oxygen. The third oxidizing gas is preferably atmospheric air neither enriched in nor depleted of oxygen, although enrichment up to 25% by volume of oxygen, or higher depending on the composition of the feed, is generally acceptable.

Preferably the mass flow rate of the first combustible gas and the mass flow rate of the second combustible gas to the burner are controlled independently of one another. Such an arrangement facilitates operation of the burner to handle variations in the total rate at which it is desired to feed combustible gas to the burner. The apparatus according to the invention therefore preferably additionally includes a first flow control valve in a first pipeline for supplying the first combustible gas to the burner, and a second flow control valve in a second pipeline for supplying the second combustible gas to the burner, the first and second control valves being operable independently of one another.

In a typical refinery there is more than one source of combustible gas comprising hydrogen sulphide. The sources typically have different compositions. Preferably the first combustible gas is of a different composition from the second combustible gas. By this means it is possible to optimise combustion of the combustible gas. Typically, both the first and second combustible gas streams contain at least 40% by volume of combustibles and at least 20% by volume of hydrogen sulphide.

If there are two separate sources of combustible gas comprising hydrogen sulphide, one containing ammonia, the other not, then all the ammonia containing gas is preferably employed in forming the first combustible gas. As a result it becomes possible to direct all the ammonia to a relatively inner region of the flame where a relatively high flame temperature can be maintained in order to destroy all the ammonia. For example, if one source of gas containing hydrogen sulphide is so-called "sour water stripper gas", which typically contains about 20 to 35% by volume of hydrogen sulphide and 30 to 45% by volume of ammonia, and another source of gas containing hydrogen sulphide is so-called "amine gas" which typically contains over 80% by volume of hydrogen sulphide, the first combustible gas may comprise a mixture of some of the amine gas but all of the sour water stripper gas, and the second combustible gas may comprise the remaining amine gas. Preferably, the composition of the mixture is varied with the total rate of flow of combustible gas comprising hydrogen sulphide to the flame, with the proportion of amine gas in the first combustible gas being increased if the said total rate of flow is reduced below a chosen value.

Preferably the mass flow rate of the first oxidizing gas and the mass flow rate of the second oxidizing gas to the burner are controlled independently of one another. Such an arrangement facilitates operation of the burner to handle variations in the total rate at which it is desired to feed combustible gas to the burner and to cater for changes in the individual mass flow rates of the first and second combustible gas streams. The apparatus according to the invention preferably additionally includes a third flow control valve in a third pipeline for supplying the first oxidizing gas to the burner, and a fourth flow control valve in a fourth pipeline for supplying the second oxidizing gas to the burner. The third and fourth control valves are operable independently of one another.

The first and second oxidizing gases may be taken from the same or different sources of oxidizing gas. If different sources are employed, the first oxidizing gas may have a different composition from the second oxidizing gas. Employing first and second oxidizing gases of different composition adds to the flexibility of the method and apparatus according to the invention in effectively handling variable rates of supply of combustible gas.

The mole fraction of oxygen in both the first and second oxidizing gas is typically in the range of 0.3 to 1.0 depending on the proportion of combustibles in the first and second combustible gases. Care should be taken to avoid creating an excessive temperature at any location in any refractory employed to line the furnace. Modern commercially available refractories can typically withstand temperatures up to 1650° C. The oxygen-enriched air or pure oxygen of which either or both of the first and second oxidizing gases may be composed may be taken directly from an air separation plant. Depending on the purity of the oxygen product of the air separation plant, either or both of the first and second oxidizing gases may have a mole fraction of oxygen greater than 0.99. In general, however, particularly when handling sour water stripper gas, or amine gas, or mixtures of the two, it is preferred to form either or both of the first oxidizing gas and the second oxidizing gas by mixing an oxygen product of the air separation plant with atmospheric air, that is air which is neither enriched in nor depleted of oxygen. Forming either or both of the first and second oxidizing gases in this way makes it possible to vary the mole fraction of oxygen during operation of the method and apparatus according to the invention. Again, this ability to vary the mole fraction of oxygen adds to the flexibility of the method and apparatus according to the invention in effectively handling varying rates of supply of combustible gas.

Mixing of the first combustible gas with the first oxidizing gas is preferably facilitated by directing at least some of the first oxidizing gas along a path or paths which meet a path or paths followed by the first combustible gas. Accordingly, the second outlet or at least some of the second group of outlets each have an axis which extends at an angle to the axis of the first outlet or the axes of at least some of the second group of outlets. The angle is preferably in the range of 10 to 30°. Preferably, the flow of the first combustible gas is axial and the flow of the first oxidizing gas is at an angle to the axis of the burner.

Alternatively, mixing of the first combustible gas with the first oxidizing gas can be facilitated by directing at least some of the first oxidizing gas at a first linear velocity along a path or paths extending generally contiguous and generally parallel to a path or paths followed by the first combustible gas at a second linear velocity, and one of the first and second linear velocities is from 25 to 150% (and preferably from 25 to 100%) greater than the other thereof. Mixing is facilitated because the differential velocity between the first oxidizing gas and the first combustible gas creates forces of shear therebetween. Preferably, it is the first linear velocity which is selected to be the greater of the two said linear velocities. This arrangement facilitates design of the furnace to ensure that all the ammonia is destroyed in it.

A further alternative for facilitating mixing of the first combustible gas with the first oxidizing gas is to impart a swirling motion to one or both of the first oxidizing gas and the first combustible gas. Devices that are able to impart swirl to the gas are well known.

The natural curvature of the flame tends to facilitate mixing of the said fourth flow of second oxidizing gas flow with the said third flow of the second combustible gas. Nevertheless, it is preferred to arrange the supply of the said third and fourth flows so as to facilitate mixing. For example, at least some of the second oxidizing gas may flow at an angle to the second combustible gas such that the flow paths intersect, or at least bring the two gases closer together. Preferably, the second combustible gas leaves the mouth of the burner essentially axially, and at least some of the second oxidizing gas leaves the mouth of the burner at an angle to the axis. The angle is typically in the range of 10 to 30° to the axis of the burner. In another arrangement the third and fourth flows leave the burner alongside one another and at different velocities such that shear therebetween aids mixing.

If the total flow of the combustible gases becomes less than the maximum for which the burner is designed, then a reduction may be made in the flow of the first and second oxidizing gases and in the mole fraction of oxygen in both oxidizing gases. Further, in order to maintain a high temperature at the core of the flame when the burner is turned down, the proportional reduction in the rate at which the second combustible gas is supplied to the burner may be greater than that in the flow rate of the first combustible gas. In addition, if the first combustible gas is a mixture of sour water stripper gas and amine gas, the proportion of amine gas in the mixture may be changed. For this purpose, the first pipeline may communicate with a source of sour water stripper gas and the second pipeline with a source of amine gas, there being a conduit placing the second pipeline in communication with the first pipeline, and a further flow control valve in the further conduit for controlling flow of amine gas into the first pipeline.

In one preferred burner according to the invention there is a first tube defining a first passageway for the first combustible gas which terminates in the first outlet and within which extend a plurality of second tubes defining second passageways for the first oxidizing gas which each terminate in a respective second outlet, and a third tube surrounding and generally coaxial with the first tube, and defining therewith an annular third passageway for the second combustible gas which terminates in the third outlet and a plurality of fourth tubes for the second oxidizing gas which each extend within the third passageway and which define fourth passageways each terminating in a respective fourth outlet. Such an arrangement permits adjustment of the flow of the first oxidizing gas independently of the flow of the second oxidizing gas, and vice versa, and also adjustment of the flow of the first combustible gas independently of the flow of the second combustible gas, and vice versa.

Alternative preferred arrangements are possible. In one such arrangement, the first and second tubes are provided and disposed as described above. In addition, there is a third tube concentric with and surrounding the first tube to define therewith an annular third passageway for flow of the second oxidizing gas, the third passageway terminating in a nozzle in which the fourth outlets are formed, and a fourth tube concentric with and surrounding the third tube to define therewith an annular fourth passageway for the second combustible gas terminating in the said third outlet. Such an arrangement also permits adjustment of the flow of the first oxidizing gas independently of the flow of the second oxidizing gas, and vice versa, and also adjustment of the flow of the first combustible gas independently of the flow of the second combustible gas, and vice versa.

In yet another preferred arrangement, there are four concentric radially spaced apart tubes defining a central tubular passageway, and innermost intermediate, and outermost annular passageways. The central tubular passageway ends in the first outlet and the outermost annular passageway in the fourth outlet. The other two passageways both end in respective nozzles, the nozzles defining the second and third groups of outlets. This arrangement is another which permits adjustment of the flow of the first oxidizing gas independently of the second oxidizing gas, and vice versa, and also adjustment of the flow of the first combustible gas independently of the second combustible gas and vice versa.

In less preferred burners there may be three concentric tubes defining a central tubular passageway and inner and outer passageways. The central tubular passageway ends in the first outlet and the outer annular passageway in the third outlet. The inner annular passageway terminates in a nozzle in which both the second and fourth group of outlets are defined. Such an arrangement does not permit the flow rate and composition of the first oxidizing gas to be adjusted independently of the flow rate and composition of the second oxidizing gas.

The resultant gas mixture is preferably cooled in a waste heat boiler, and the cooled effluent gas stream is preferably passed to a condenser in which sulphur vapor is condensed therefrom. The resultant gas stream is preferably subjected downstream of the sulphur condenser to at least one stage of catalytic reaction between hydrogen sulphide and sulphur dioxide so as to enable further sulphur to be extracted.

BRIEF DESCRIPTION OF THE DRAWINGS

The method and apparatus according to the present invention will now be described, by way of example, with reference to the accompanying drawings in which.

DETAILED DESCRIPTION OF THE INVENTION

Figure 1:
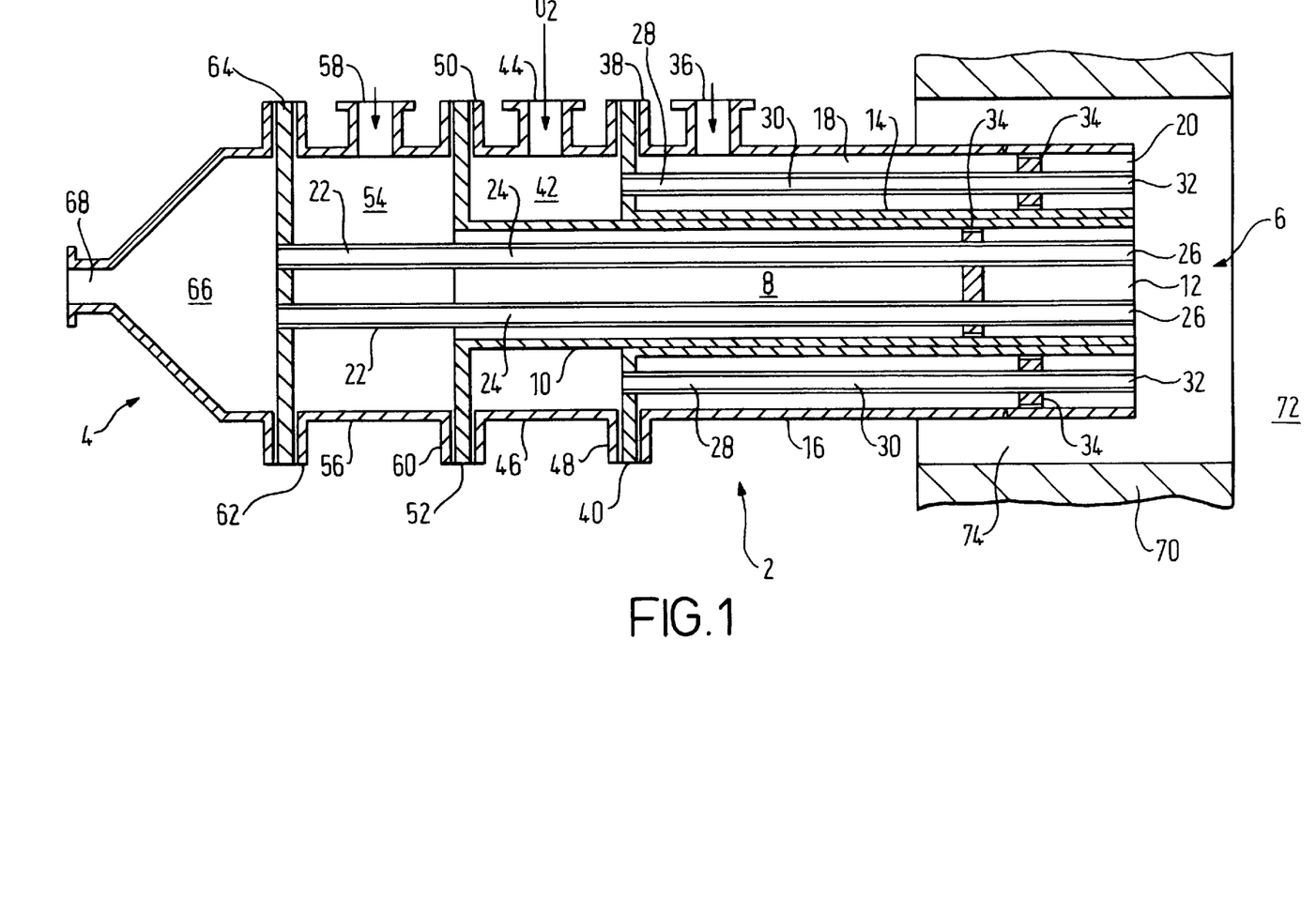
FIG. 1 is a schematic sectional side elevation of a first burner for use in the method and apparatus according to the invention.
Figure 2:
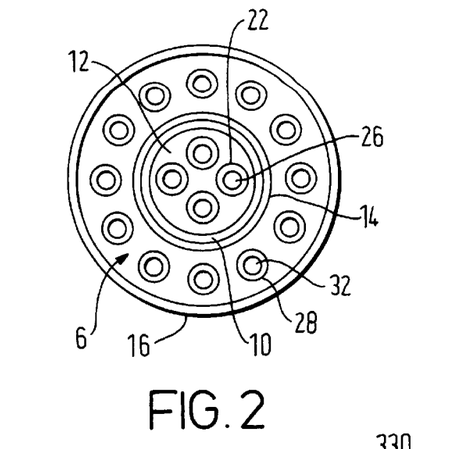
FIG. 2 is a schematic end view of the mouth of the burner shown in FIG. 1.

Referring to FIGS. 1 and 2 of the drawings, a burner 2 is of generally cylindrical shape and has a proximal end 4 and a distal end (or mouth 6). The burner 2 has a central passageway 8 defined by an innermost tube 10 for flow of a first combustible gas stream comprising hydrogen sulphide. The longitudinal axis of the burner 2 is coincident with the longitudinal axis of the tube 10. The central passageway 8 has a first outlet 12 at its distal end. A second tube 14 is coaxial with the first tube 10. The inner surface of the tube 14 makes a frictional engagement with the outer surface of the tube 10. (Alternatively the tubes 10 and 14 may be joined to one another by means of an internal flange or welded connection.) A third tube 16 is spaced from and is coaxial with the tube 14. Tubes 14 and 16 define a second, annular, passageway 18 for a second flow of combustible gas mixture comprising hydrogen sulphide terminating at its distal end in an outlet 20 (hereinbefore termed "the third outlet") for the second combustible gas mixture. The tubes 14 and 16 terminate in the same plane as the tube 10.

An array of tubes 22 extends from beyond the proximal end of the tube 10 therethrough and defines passages 24 for the flow of a first oxidizing gas mixture. Each passageway 24 has an outlet 26. (These outlets are termed "the second group of outlets" hereinabove.) The tubes 22 terminate in the same plane as the tube 10. The outlets 26 are typically disposed in a ring which is coaxial with the longitudinal axis of the burner 2.

A second array of tubes 28 is disposed in the passageway 18 defined by the tubes 14 and 16. Each tube 28 each defines a passageway 30 for a second flow of oxidizing gas terminating in respective outlet 32. The tubes 28 each terminate in the same plane as the tube 10. The outlets 30 of the tubes 28 are arranged in a ring which is coaxial with the longitudinal axis of the burner 2. The respective tubes 22 and 28 may each be provided with a spider 34 to help support them when the burner is disposed with its longitudinal axis horizontal as shown in FIG. 1. There is considerable flexibility in selecting the actual numbers of the tubes 22 and 28.

The construction of the burner 2 so as to enable to the respective flows of combustible gas and oxidizing gas mixtures to be supplied to it is relatively simple. The outer tube 16 is provided with a first port 36 for the flow of the second combustible gas mixture comprising hydrogen sulphide. The proximal end of the outer tube 16 is formed with a flange 38 integral therewith or welded thereto. The flange 38 is bolted or otherwise secured to a similar flange 40 which is integral with or welded to the tube 14. If desired, a gasket or other sealing member (not shown) can be engaged between the flanges 40 and 38 so as to ensure a fluid-tight seal therebetween. The flange 40 forms the distal end of a chamber 42 which receives the second oxidizing gas and which has a port 44 enabling it to be placed in communication with a source of such oxidizing gas. The proximal ends of the tubes 28 are all received fluid-tight in complementary apertures through the flange 40. Thus, the tubes 26 communicate with the chamber 42. The chamber 42 has an outer wall 46, in which the port 44 is formed, which is provided at its distal end with a flange 48 which is fastened fluid-tight to the flange 40 and at its proximal end with a flange 50. The flange 50 is bolted or otherwise secured fluid-tight to a complementary flange 52 which is integral with or is welded to the proximal end of the tube 10. The flange 52 forms a proximal wall of the chamber 42. It also forms a distal wall of a further chamber 54 having a side wall 56 with a port 58 formed therein which enables the chamber 54 to be placed in communication with a source of the first combustible gas. The wall 56 of the chamber 54 has a first flange 60 at its distal end which is bolted or otherwise secured fluid-tight to the flange 52 and a second flange 62 at its proximal end which is bolted or otherwise secured fluid-tight to an end plate 64 which forms a dividing wall between the chamber 54 and a yet further chamber 66 for the first oxidizing gas mixture and which receives fluid-tight in apertures formed therethrough the proximal ends of the tubes 22 so as to enable these tubes to receive a flow of the first oxidizing gas mixture. The chamber 66 is provided with a port 68 which is coaxial with the longitudinal axis of the burner 2 and is able to be placed in communication with the source of the first oxidizing gas mixture.

As shown in FIG. 1, the distal end 6 of the burner 2 extends into a port or quarl 70 of a furnace 72 for the partial combustion of hydrogen sulphide. An annular passage is defined between the distal end of the burner 2 and the port 70. Air is supplied to this passage 74 as a third oxidizing gas.

If desired, the distal end of the outer tube 16 may be formed of a refractory metal. Other parts of the burner 2 may be formed of stainless steel.

In operation, the first combustible gas exiting the burner 2 from the outlet 12 becomes intimately mixed with the first oxidizing gas that leaves through the outlets 26 to form a first stage of a flame. Similarly, the flow of second combustible gas mixture leaving the burner 2 through the outlet 20 becomes intimately mixed with the flow of the second oxidizing gas which leaves the burner 2 through the outlets 32, thus forming a second stage of the flame. A third stage of the flame is formed by intimate mixing of the air passing through the passage 74 with the second combustible gas mixture leaving the burner 2 through the outlet 20.

Figure 11:
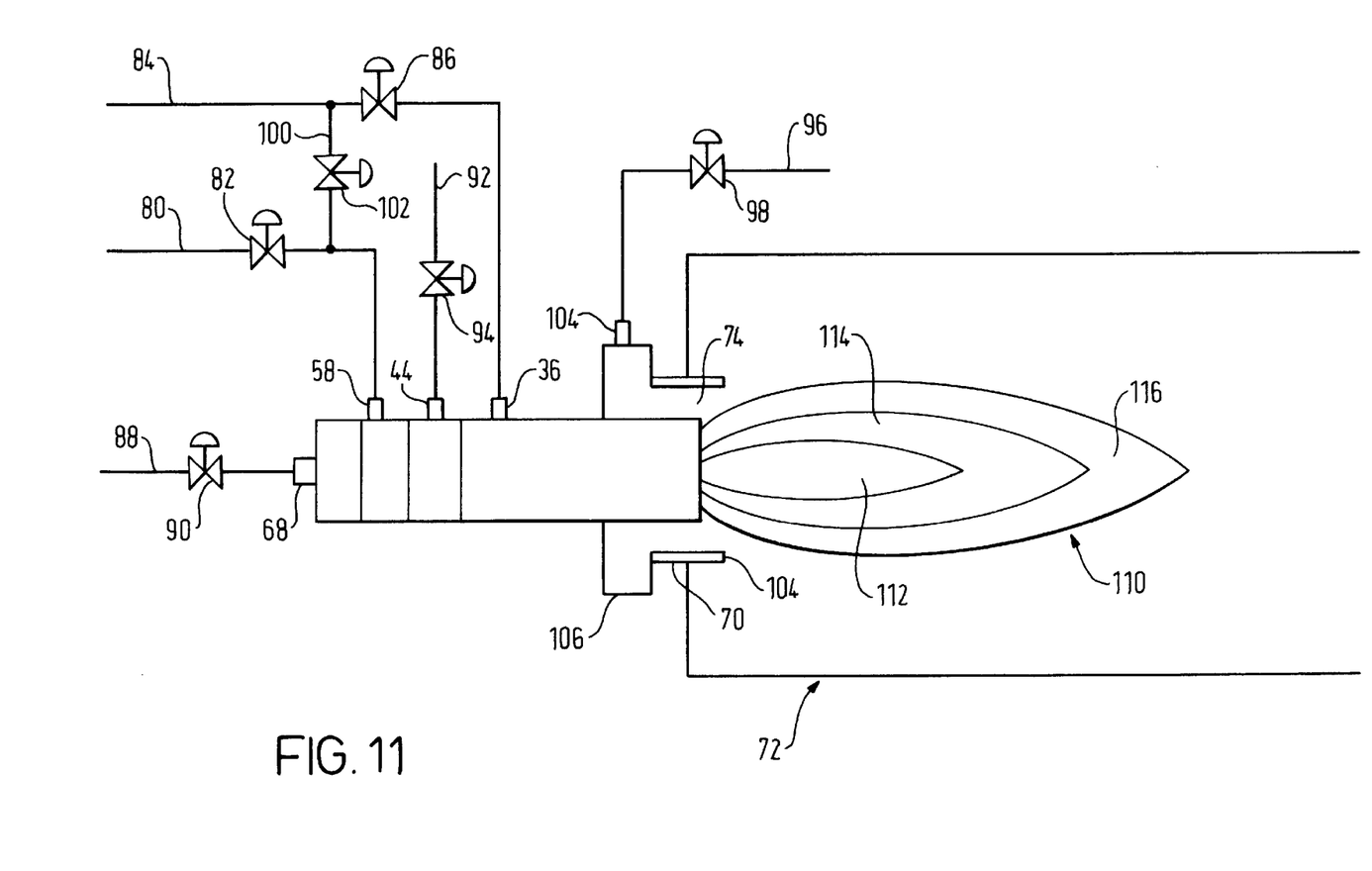
FIG. 11 is a schematic flow diagram illustrating apparatus for supplying combustible gas and oxidizing gas to the burner in FIGS. 1 and 2.

Arrangement for supplying different gas flows to the burner 2 is shown in FIG. 11. Referring to FIG. 11, a first pipeline 80 for sour water stripper gas (which includes both hydrogen sulphide and ammonia) terminates in the port 58 of the burner 2. The first flow control valve 82 is disposed in the pipeline 80. A second pipeline 84 for amine gas (which predominantly comprises hydrogen sulphide) terminates in the port 36 of the burner 2 and has a second flow control valve 86 disposed therein. A third pipeline 88 communicating with a source (not shown) of first oxidizing gas composed of air or oxygen-enriched air terminates in the port 68 of the burner 2. A third flow control valve 90 is located the third pipeline 88. A fourth pipeline 92 communicating with a source (not shown) of second oxidizing gas composed of air or oxygen-enriched air terminates in the port 44 of the burner 2. A fourth flow control valve 94 is located in the fourth pipeline 92. A fifth pipeline 96 communicating with a blower (not shown) or other source of compressed air (neither enriched in nor depleted of oxygen) terminates in an inlet 104 to a nozzle 106 which communicates with the annular passage 74 defined between the ports 70 and the burner 2. The pipeline 96 has a fifth flow control valve 98 disposed therein. In addition, a pipeline 100 extends through a region of the second pipeline 84 upstream of the second flow control valve 86 to a region of the first pipeline 80 downstream of the first flow control valve 82. A sixth flow control valve 102 is disposed in the pipe 100.

In operation, the flow control valves described above may be set to determine the overall mole ratio of combustibles to oxygen supplied to the flame of the burner 2, so as to enable different local ratios of the reacting species to be created in different regions of the flame, so as to enable a hot innermost region to be maintained in the flame at a temperature in excess of 1400° C., so as to enable a much lower temperature to be maintained at the periphery of the flame, to create within a localised region of the flame conditions which favour thermal dissociation of hydrogen sulphide, and to ensure that all ammonia is destroyed. Typically, the rates of supply of the reactants are controlled such that the mole ratio of hydrogen sulphide to sulphur dioxide and the gas mixture leaving the furnace is approximately 2:1. Within the respective regions of the flame, however, the mole ratio of hydrogen sulphide to sulphur dioxide can vary significantly.

The kind of flame that is formed in operation of the burner is shown schematically in FIG. 11 and is indicated therein by the reference numeral 110. The flame has three stages 112, 114 and 116. The innermost stage 112 is a high intensity zone into which the first oxidizing gas and the first combustible gas flow. In an example in which the first combustible gas is composed of a mixture of sour water stripper gas and amine gas, the first oxidizing gas is supplied at a rate that is sufficient to ensure the complete destruction of ammonia and any hydrocarbons in the first combustible gas and oxidation of more than one third of the hydrogen sulphide. A high temperature in the innermost stage 112 is thus ensured. The temperature can be controlled by the control valves 82, 90 and 102.

The second intermediate stage 114 of the flame 110 receives the second oxidizing gas and part of the second combustible gas. This stage 114 is typically operated oxygen-poor that is to say that the relative rates of supply of hydrogen sulphide and oxygen molecules to this stage are such that less than one third of this hydrogen sulphide is oxidised to sulphur dioxide. The paucity of oxygen in this region together with the heat radiated from the inner stage 106 favour formation of sulphur vapor by thermal cracking of hydrogen sulphide. Since the thermal cracking of hydrogen sulphide proceeds endothermically, it provides a mechanism for moderating flame temperature and helps to prevent excessive temperatures being created in the outermost stage 116. Further, it can reduce the demand for nitrogen molecules to moderate the flame temperature, and thereby enables the first and second oxidizing gases to have higher mole fractions of oxygen than would otherwise be possible. The temperature can be controlled in the stage 108 by the rate of flow of the first combustible gas and by its mole fraction of oxygen. The third outermost stage 116 of the flame receives the rest of the second combustible gas and the air which is supplied as the third oxidizing gas to the pipeline 96. The rate of supply of air is controlled so as to ensure that an excessive flame temperature is not created in the stage on 116. The total supply of oxidant is controlled such that the desired ratio of $H_2S$ to $SO_2$ is maintained after the waste heat revilers.

When the combined rates of supply of the first and second combustible gas are at a specified maximum, typically the rates of supply of the oxidizing gases are each at a maximum. If the total rate of supply of combustible gas falls, various control strategies are available to maintain suitable combustion conditions in the flame. Most simply, the control valves 94 and 98 may be reset to make a complementary reduction in the flow rate of the oxidizing gases. In addition, means (not shown) may be provided in the apparatus shown in FIG. 11 for adjusting the mole fraction of oxygen in the first and second oxidizing gases. For example, additional flow control valves (not shown) may be provided in pipes (not shown) which introduce commercially pure oxygen into the third and fourth pipelines 88 and 92, respectively. Thus, the mole fraction of the oxygen in the first and second oxidizing gases may be controlled.

Care needs to be taken when operating the burner with a supply of combustible gas less than the specified maximum to ensure that all the ammonia is destroyed before the effluent gases leave the furnace 72. Another control strategy which can be used when the rate of supply of the combustible gas is relatively low is to increase the proportion of the amine gas which is diverted through the sixth pipeline 100. The sixth control valve 102 may be set accordingly. Supplying a greater proportion of the amine gas to the first combustible gas maintains the velocity of the first combustible gas and facilitates maintenance of a high ammonia and hydrocarbon destruction rate particularly when the first oxidizing gas is air. As a result, compared with operation at the maximum specified throughput of combustible gases, there is a disproportionate reduction in the rates at which the second combustible gas and the second oxidizing gas are supplied to the burner.

It is possible to increase the rate at which the burner shown in FIGS. 1 and 2 is able to handle the combustible gases by supplying amine gas rather than air to the passage 74. In order to maintain the desired ratio of hydrogen sulphide to oxygen molecules entering the flame, the mole fraction of oxygen in the first and second oxidizing gases is correspondingly increased. Prior to employing the passage 74 to handle amine gas, this passage may be purged with nitrogen or other non-combustible gas so as to flush oxygen molecules therefrom.

Referring again to FIGS. 1 and 2, it will be appreciated that all the gas streams leave the burner 2 substantially axially. Mixing between the first oxidizing gas leaving the burner 2 through the outlets 26 and the first combustible gas leaving through the outlets 12 thereby takes place by virtue of shear between the respective gas streams. The degree of shear is enhanced by having a differential velocity between the first combustible gas and first oxidizing gas. In one illustrative example, the velocity of the first oxidizing gas leaving the burner 2 is 60 m/s and the velocity of the first combustible gas is 40 m/s.

Figure 3:
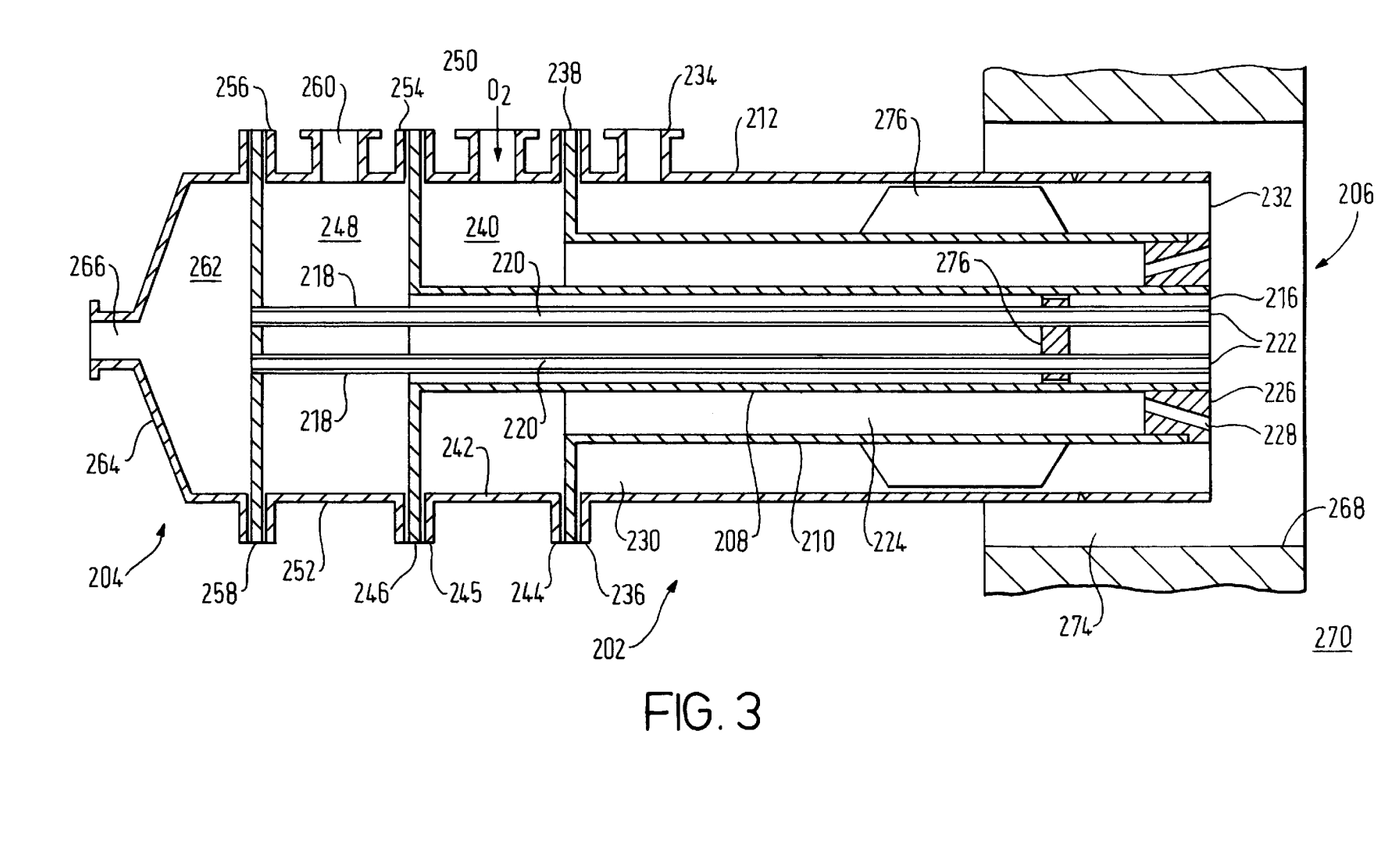
FIG. 3 is a schematic sectional side elevation of a second burner for use in the method and apparatus according to the invention.
Figure 4:
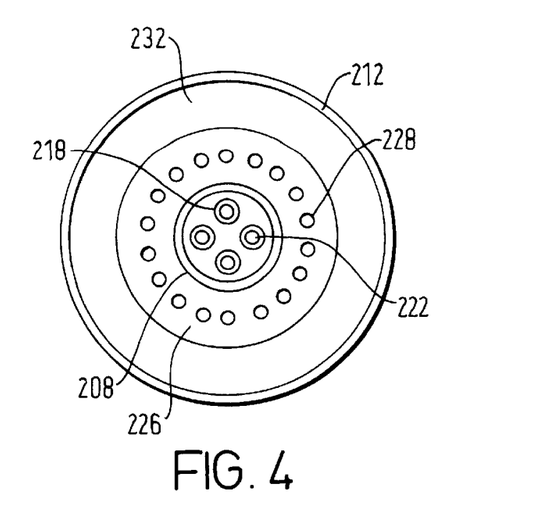
FIG. 4 is a schematic end view of the burner shown in FIG. 3.

Referring now to FIGS. 3 and 4 of the drawings, a burner 202 has a proximal end 204 and a distal end 206. The burner 202 is formed with three coaxial tubes 208, 210 and 212 which are radially spaced from one another. The axis of the tube 208 is coincident with the longitudinal axis of the burner 202 itself. The tube 208 defines a passageway 214 for a first combustible gas mixture. The passageway 214 terminates at its distal end in an outlet 216 for the first combustible gas.

Extending within the tube 208 from beyond its proximal end is an array of tubes 218 each defining a respective passageway 216 for the flow of a first oxidizing gas. Each tube 218 terminates at its distal end in the same plane as the end of the tube 208. Each tube 218 has an outlet 222 for the first oxidizing gas. The tube 210 defines with the tube 208 a passageway 224 for the flow of a second oxidizing gas. The passageway 224 terminates at its distal end in a nozzle 226 in which are formed at an angle to the axis of the burner outlets 228 for the second oxidizing gas. The outlets 228 terminate in the same plane as the distal end of the tube 208. The nozzle 226 is engaged fluid-tight between the tubes 208 and 210. If desired, the distal end of the nozzle 226 may be formed with an annular projection which is welded to the end of the tube 210. The tubes 210 and 212 define an annular passageway 230 for the flow of a second combustible gas. The passageway 230 terminates at its distal end in an outlet 232 in the same plane as the outlet 216. The outlets 228 formed in the nozzle 226 direct, in use, the second oxidizing gas into the second combustible gas comprising hydrogen sulphide issuing from the outlet 232.

The burner shown in FIGS. 3 and 4 has relatively simple arrangements for the supply of the gas streams to it. Thus, the tube 212 has an inlet port 234 for the supply of second combustible gas mixture comprising hydrogen sulphide. The tube 212 has integral therewith or welded thereto at its distal end a flange 236 which is bolted or otherwise secured fluid-tight to a complementary flange 238 integral with or welded to the proximal end of the tube 210. The flange 238 forms a distal wall of a chamber 240 for receipt of a second oxidizing gas. The chamber 240 has a cylindrical wall 242 having at its distal end a flange 244 which is bolted or otherwise secured fluid-tight to the flange 238 and at its proximal end another flange 244 which is bolted or otherwise secured fluid-tight to a complementary flange 246 integral with or welded to the proximal end of the tube 208. The flange 246 forms the proximal wall of the chamber 240 and a distal wall of a further chamber 248 for the first combustible gas. The cylindrical wall 242 of the chamber 240 has an inlet port 250 enabling the chamber 240 to be placed in communication with the source of a second oxidizing gas. The chamber 248 has a cylindrical wall 252 which has at its distal end a first flange integral therewith or welded thereto which is bolted or otherwise secured fluid-tight to the flange 246 and at its proximal end a second flange 256 which is bolted or otherwise secured fluid-tight to an end plate 258 which forms the proximal wall of the chamber 248. The cylindrical wall 252 has a port 260 for the admission of the first combustible gas comprising hydrogen sulphide. The end plate 258 also forms a wall of a yet further chamber 262 for the first oxidizing gas. The chamber 262 is defined between the end plate 258 and a generally conical member 264 which is bolted or otherwise secured fluid-tight thereto. The member 264 is formed with an axial port 266 which is coaxial with the burner 202.

The distal end 206 of the burner 202 extends into a port 268 of a furnace 270 for the partial combustion of hydrogen sulphide. A passage 274 for air as a third oxidizing gas is defined between the outer tube 212 and the port 268.

The tubes 214 and 222 may be supported by spiders or fins 276 when the burner is disposed with its longitudinal axis horizontal as shown in FIG. 3.

Operation of the burner shown in FIGS. 3 and 4 is analogous to that shown in FIGS. 1 and 2. Mixing of the first oxidizing gas with the first combustible gas is facilitated by a differential velocity therebetween. Mixing of the second oxidizing gas with a second combustible gas is additionally facilitated by the angling of the outlets 228 towards the flow of gas issuing from the outlet 232.

Figure 5:
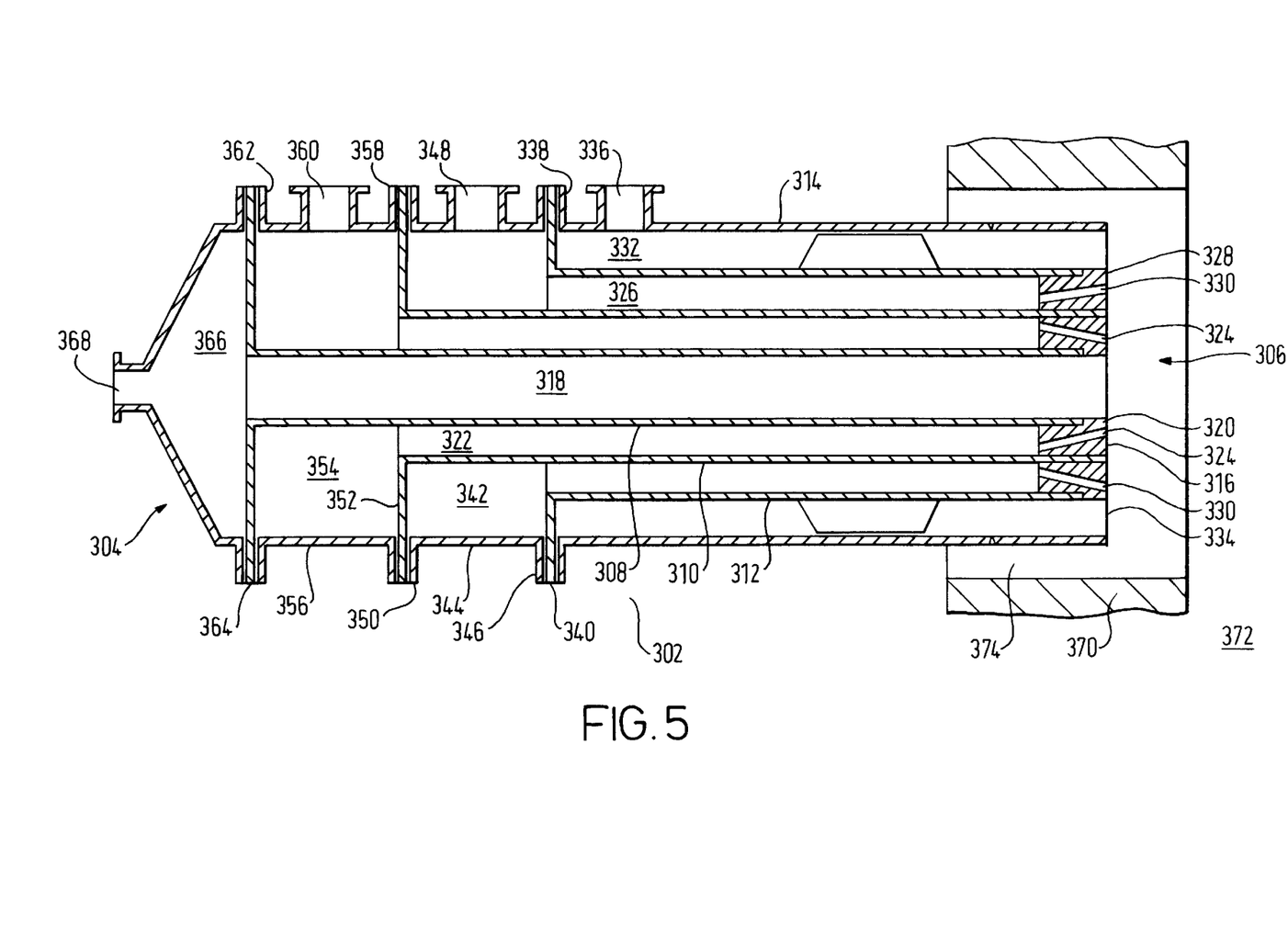
FIG. 5 is a schematic sectional side elevation of a third burner for use in the method and apparatus according to the invention.
Figure 6:
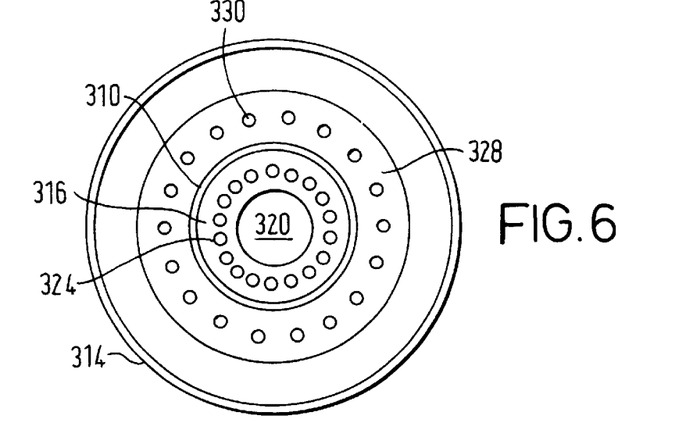
FIG. 6 is a schematic end view of the mouth of the burner shown in FIG. 5.

Referring now to FIGS. 5 and 6 of drawings, a burner 302 is of generally cylindrical shape and has a proximal end 304 and a distal end 306. The burner comprises an array of four radially spaced apart, concentric, tubes 308, 310, 312 and 314 which are coaxial with the longitudinal axis of the burner 302. The tube 308 is innermost and the tube 314 outermost. The tube 312 surrounds the tube 310. The tubes 308 and 310 engage at their distal ends a first nozzle 316. The tube 308 defines a first passageway 318 for a first combustible gas comprising hydrogen sulphide. The distal end of the tube 308 is set back relative to the distal end of the tube 310 and the nozzle 316 is provided with an inward annular projection which defines an outlet 320 from the burner 302 for the first combustible gas. The tubes 308 and 310 define an annular passageway 322 for a first oxidizing gas. The passage 322 terminates in the nozzle 316 which has formed therethrough, at an angle of 10 to 15 degrees to the horizontal, outlets 324 from the burner 302 for the first oxidizing gas. The outlets 324 direct the first oxidizing gas into the first combustible gas at a region downstream of the distal end 306 of the burner 302. The tubes 310 and 312 define therebetween an annular passageway 326 for the flow of a second oxidizing gas. The passageway 326 terminates in a nozzle 328 which defines outlets 330 for the second oxidizing gas. The outlets are inclined at an angle of 10 to 15 degrees to the horizontal and extend radially outward in the direction of the flow of the gas therethrough.

The tube 312 and the outermost tube 314 define therebetween an annular passageway 332 for a second combustible gas comprising hydrogen sulphide. The passageway 322 has an outlet 334 at its distal end for the second combustible gas. In operation, downstream of the outlet 334 the second combustible gas flow becomes mixed with the flow of second oxidizing gas by virtue of the orientation of the outlets 330 relative to that of the outlet 334.

The outermost tube 314 is provided with a port 336 for the flow of the second combustible gas mixture. The proximal end of the tube 314 is formed with a flange 338 integral therewith or welded thereto. The flange 338 is bolted or otherwise secured to a similar flange 340 which is integral with or welded to the tube 312. If desired, a gasket or other sealing member (not shown) can be engaged between the flanges 338 and 340 so as to ensure a fluid-tight seal therebetween. The flange 340 bounds in part a chamber 342 which is contiguous to the passage 326. The chamber 342 has a cylindrical wall 344 which is provided at its distal end with the flange 346 which is bolted or otherwise secured fluid-tight to the flange 340. The wall 344 has a port 348 formed therein so as to enable the second oxidizing gas to be supplied to the chamber 342. The proximal end of the wall 344 is provided with a flange 350 which is bolted or otherwise secured fluid-tight to a complementary flange 352 integral with or welded to the proximal end of the tube 310. The flange 352 forms a common wall between the chamber 342 and a further chamber 354 for the first oxidizing gas. The chamber 354 is contiguous to the passageway 322. The chamber 354 has a cylindrical wall 356 which has at its distal end a flange 358 which is bolted or otherwise secured fluid-tight to the flange 352. The cylindrical wall 356 has a port 360 formed therethrough so as to enable the chamber 354 to receive first oxidizing gas. The proximal end of the wall 356 also carries a flange 362 which is bolted or otherwise secured to a flange 364 which is formed integral with or is welded to the proximal end of the innermost tube 308. The flange 364 forms a common wall between the chamber 354 and a yet further chamber 366 which is contiguous to the passageway 318 and communicates therewith. The chamber 366 is provided with an axial port 368 to which the first combustible gas is able to be supplied. The port 368 is coaxial with the longitudinal axis of the burner 302. As shown in FIG. 5, the distal end 306 of the burner 302 extends into a port or quarl 370 of a furnace 372 for the partial combustion of hydrogen sulphide. An annular space defined between the port 370 and the burner 306 provides a passage 374 for the flow of a third oxidizing gas, namely air. In operation, the air becomes mixed with the second combustible gas leaving the burner 302 through the outlet 334.

Operation of the burner shown in FIGS. 5 and 6 is analogous to that shown in FIGS. 1 and 2 and that shown in FIGS. 3 and 4.

Figure 7:
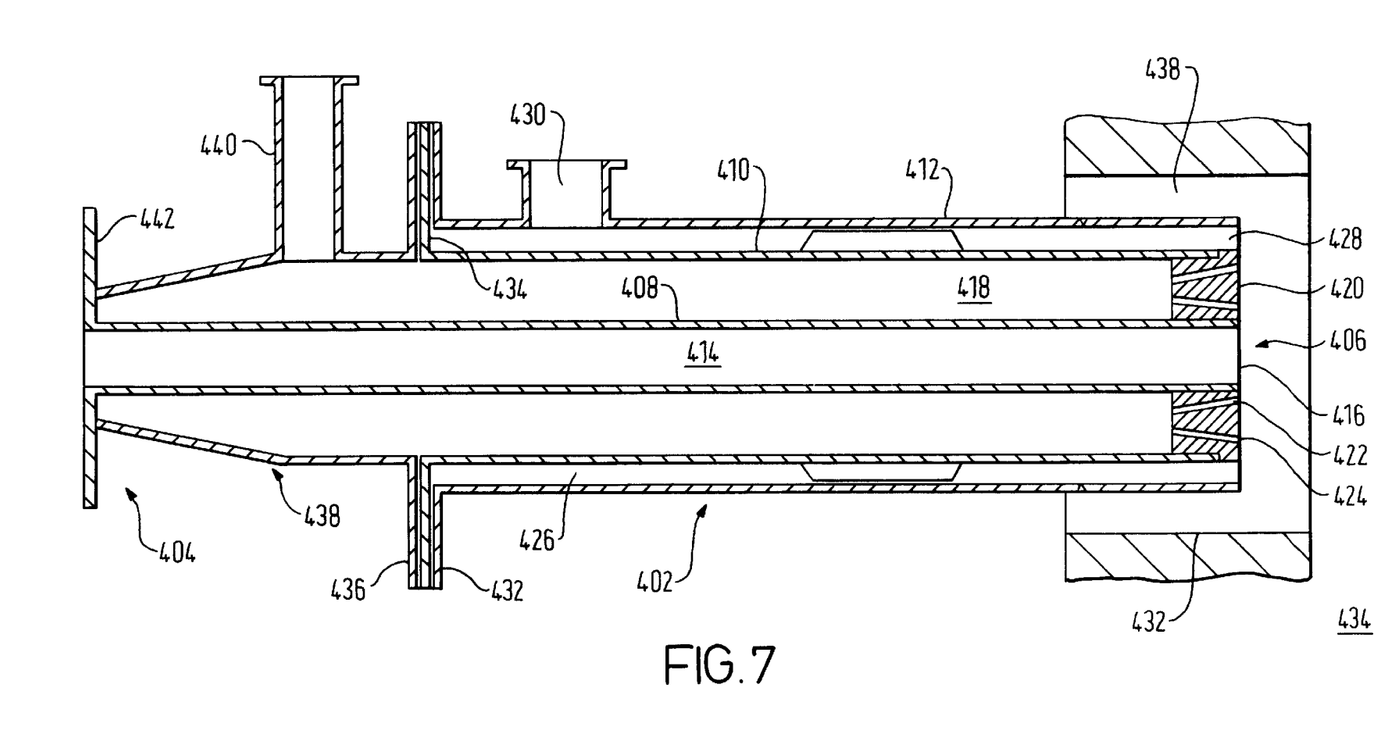
FIG. 7 is a schematic sectional side elevation of a fourth burner for use in the method and apparatus according to the invention.
Figure 8:
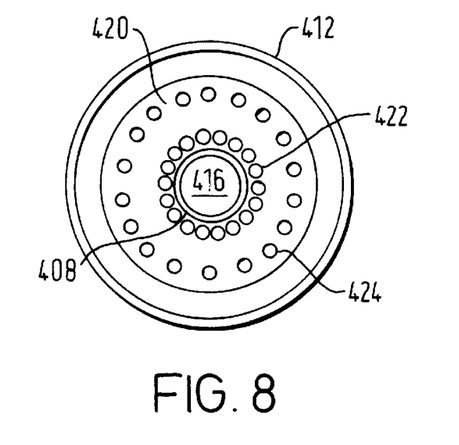
FIG. 8 is a schematic end view of the mouth of the burner shown in FIG. 7.

Referring now to FIGS. 7 and 8 of the drawings, a burner 402 has a proximal end 404 and a distal end 406. The burner comprises an assembly of three coaxial radially spaced apart tubes 408, 410 and 412. The tubes 408 defines a passageway 414 having at its distal end an outlet 416 for a first combustible gas comprising hydrogen sulphide. The tubes 408 and 410 define therebetween an annular passageway 418 for a flow of oxidizing gas, for example, oxygen enriched air. The passageway 418 terminates at its distal end terminates in an annular nozzle 420 which has a group of first outlets 422 formed therethrough and each inclined at the same angle in the range of 10 to 15 degrees to the longitudinal axis of the burner and which are inclined towards this axis in a direction of gas flow therethrough. The outlets 422 provide a flow of first oxidizing gas which mixes with the first combustible gas downstream of the distal end 406 of the burner 402.

A second group of outlets 424 is also formed through the nozzle 420. The outlets 424 are each inclined at the same angle in the range of 10 to 15 degrees to the longitudinal axis of the burner 402, the gas diverging from the axis in its direction of flow. The group of outlets 424 therefore enable a second oxidizing gas to issue from the distal end 406 of the burner 402. An annular passageway 426 is defined between the tubes 410 and 412. The passageway 426 terminates at its distal end in an outlet 428. In operation, the second combustible gas issues from the distal end 406 of the burner 402 through the outlet 428 and becomes mixed with the second oxidizing gas leaving the burner 402 through the outlets 424. The flow ratio of the first oxidizing gas to the second oxidizing gas is determined by the relative cross-sectional areas of the outlets 422 and 424.

The tube 412 has a port 430 formed therein to enable the passageway 426 to be placed in communication with a source of the second combustible gas comprising hydrogen sulphide. The proximal end of the tube 412 has a flange 432 formed integral therewith or welded thereto. The flange 432 is bolted or otherwise secured fluid-tight to a complementary flange which is welded to or formed integral with the tube 410. The flange 434 is also bolted or otherwise secured fluid-tight to a complementary flange 436 extending from an end piece 438 which is provided with an inlet port 440 for the oxidizing gas. The tube 408 extends at its proximal end into the end piece 438 and carries a flange 442 to which the proximal end of the end piece 438 is welded or otherwise secured fluid-tight. Oxidizing gas flows, in operation of the burner 402, into the port 440 and through the end piece 438 into the passageway 418 defined between the tubes 408 and 410. The tube 408 is open at its proximal end and may be placed in communication with a source of the first combustible gas comprising hydrogen sulphide.

The distal end 406 of the burner 402 extends into a port 432 of a furnace 434 for the partial combustion of the hydrogen sulphide. An annular passage 438 is defined between the burner and the port 432 through which a third oxidizing gas, typically air, can be supplied to the burner flame in operation of the burner 402.

The operation of the burner 402 is analogous to that of any of the burners shown in FIGS. 1 and 2, FIGS. 3 and 4 and FIGS. 5 and 6 of the accompanying drawings with the exception that there is no facility for varying the composition and the flow rate of the first oxidizing gas independently of the composition and flow rate of the second oxidizing gas, because both are taken from a common source supplied to the port 440 of the burner 402.

Figure 9:
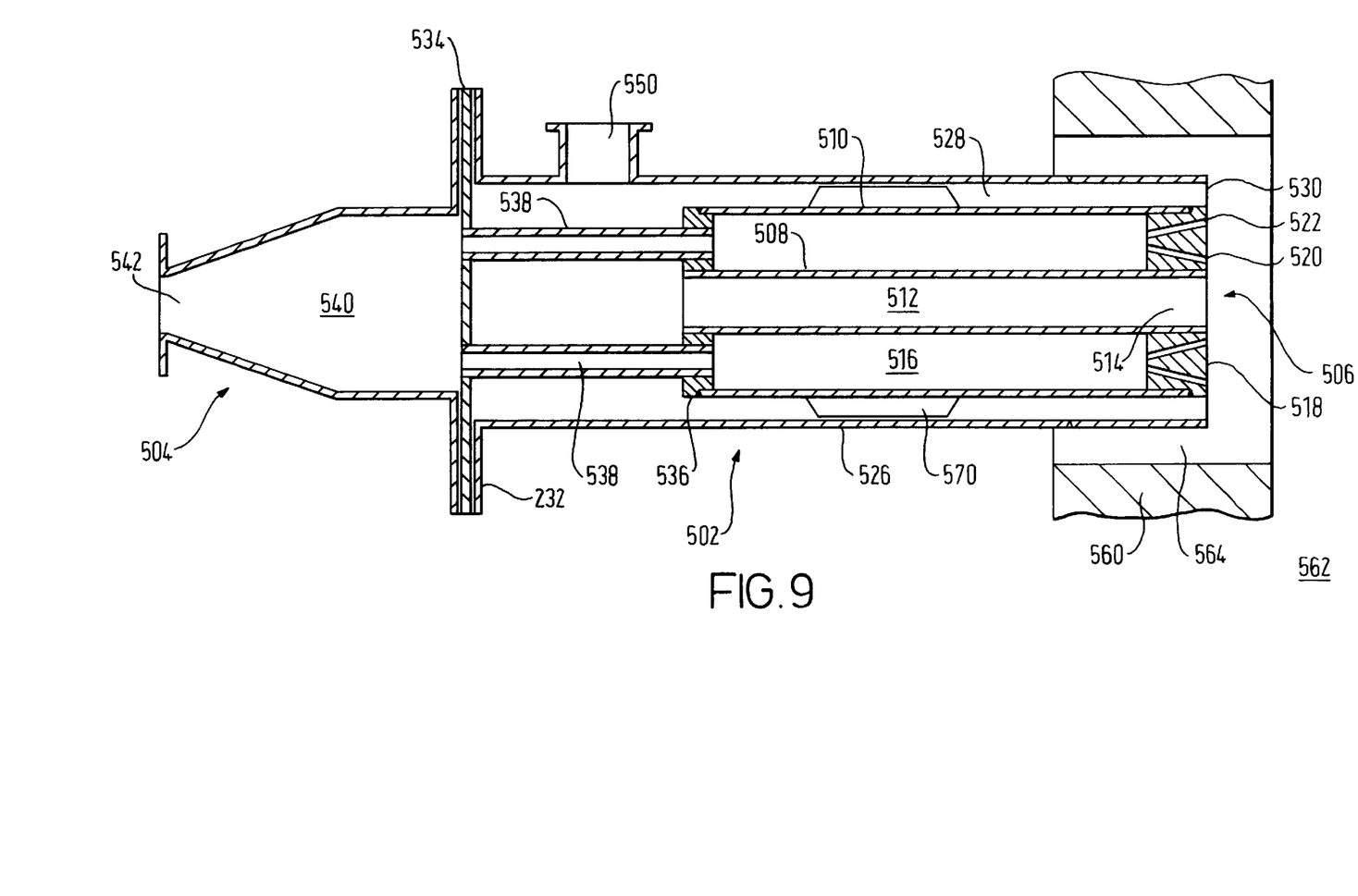
FIG. 9 is a schematic sectional side elevation of the fifth burner for use in the method and apparatus according to the invention.
Figure 10:
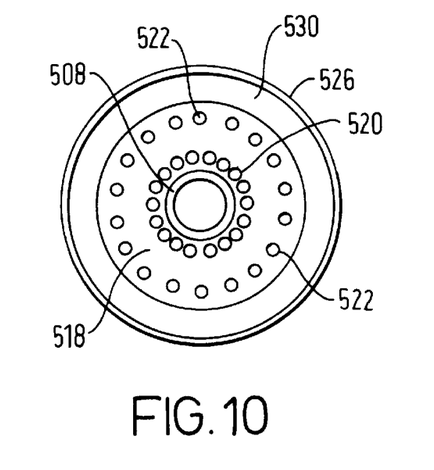
FIG. 10 is a schematic end view of the mouth of the burner shown in FIG. 9.

Referring now to FIGS. 9 and 10 of the drawings, a burner 502 has a proximal end 504 and a distal end 506. The burner 502 includes an assembly of two inner coaxial tubes 508 and 510. The inner tube 508 defines a passageway for a first flow of gas mixture comprising hydrogen sulphide. The passageway 512 has at its distal end an outlet 514. The tubes 508 and 510 define therebetween an annular passageway 516 for the flow of an oxidizing gas, typically oxygen-enriched air. The passageway 516 terminates at its distal end in an annular nozzle 518. The nozzle 518 has a first group of outlets 520 formed therethrough. The outlets 520 are each inclined at the same angle towards the longitudinal axis of the passageway 512, in the direction of flow of the gas. The nozzle 518 is also provided with a second group of inclined outlets 522. The outlets 522 are each inclined at the same angle to the longitudinal axis of the tube 508, the outlets 524 being arranged such that the gas is conducted away from the axis. The nozzle 518 is therefore able to divide the oxidizing gas into a first flow which is conducted into the gas leaving the outlet 514 and a second flow which is conducted into a second flow of combustible gas comprising hydrogen sulphide, as will be described below.

The assembly of the tubes 508 and 510 is located within an outermost tube 526. The tube 526 is coaxial with the tubes 508 and 510. It terminates at its distal end in the same plane as the distal end of the tube 512. However, its proximal end is closer to the proximal end 504 of the burner 502 than the proximal ends of the tubes 508 and 510. The tube 526 defines with the tube 510 an annular passage 528 for the flow of combustible gas mixture comprising hydrogen sulphide. The passageway 528 terminates at its distal end in an outlet 530. In operation, the second flow of oxidizing gas from the group of outlets 522 becomes mixed with the flow of hydrogen sulphide containing gas leaving the burner 502 through the outlet 530.

The tube 526 has formed integral therewith or welded thereto at its proximal end a flange 532. The flange 532 is bolted or otherwise fastened fluid-tight to an end plate 534. The tubes 508 and 510 engage fluid-tight an annular closure 536 at their proximal ends. The pipes 538 are engaged fluid-tight at the distal ends in the closure 536 and at their proximal ends by the end plate 534, and communicate with a chamber 540 for oxidizing gas which is bounded at one end by the end plate 534 and which is secured fluid-tight thereto. The chamber 540 has an inlet 542 for oxidizing gas. Thus, in operation of the burner 502, oxidizing gas is able to flow from the chamber 540 through the pipes 538 into the passageway 516. It is then divided by the nozzle 518 into a first flow through the outlets 520 which mixes with the combustible gas issuing from the outlet 514 and a second flow through the outlets 522 which mixes with the combustible gas issuing from the outlet 530. The combustible gas is itself supplied to the burner 502 through a port 550 in the tube 526. The flow of combustible gas will naturally be distributed between the outlets 514 and 530, relative proportions flowing to each outlet depending on the relative sizes of the outlets 514 and 530.

The distal end 506 of the burner 502 is received in a port 560 of a furnace 562 for the partial combustion of the hydrogen sulphide. The burner 502 and the port 560 define therebetween a further annular passageway 564 for the flow of air to the burner flame, the air becoming mixed with the hydrogen sulphide, containing gas issuing from the outlet 530.

If desired, the tube 510 may carry on its outer surface support fins 570 so as to enable the assembly of the tubes 508 and 510 to be centrally located within the outermost tube 526.

The burner shown in FIGS. 9 and 10 may be operated similarly to the other burners described and illustrated therein. However, although a three stage flame is able to be formed, there is no facility for varying the composition and flow of the hydrogen sulphide-containing gas mixture exiting the burner 502 through the outlet 514 from that exiting through the outlet 530. Similarly, there is no facility for varying the composition and flow rate of the oxidizing gas exiting through the outlets 520 independently of the flow rate and composition of the oxidizing gas exiting through the outlets 522.

Figure 12:
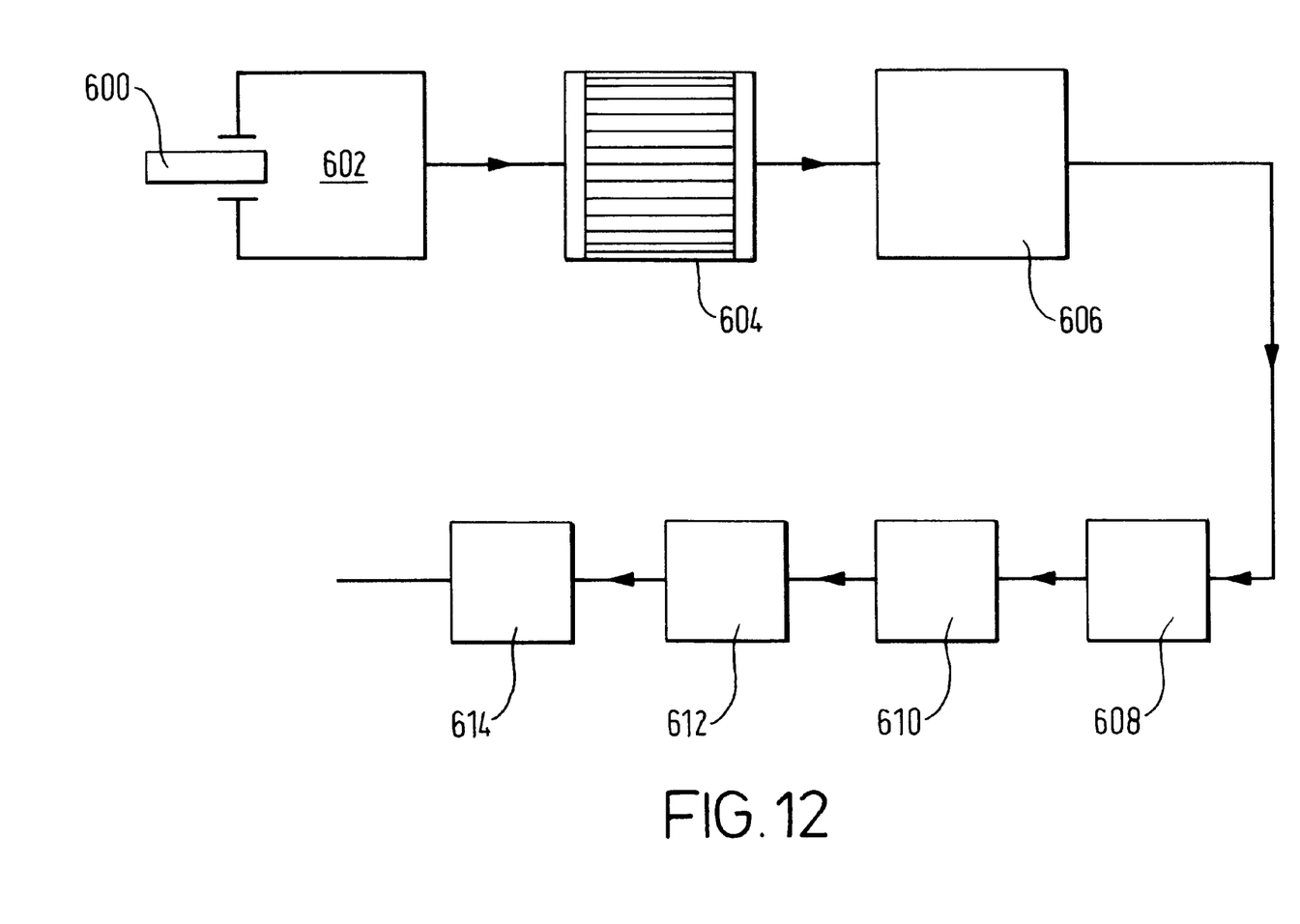
FIG. 12 is a schematic flow diagram of a Claus plant for treating an acid gas including hydrogen sulphide which may use any of the burners shown in FIGS. 1 and 2, FIGS. 3 and 4, FIGS. 5 and 6, FIGS. 7 and 8, and FIGS. 9 and 10.

Any of the burners shown in FIGS. 1 and 2, FIGS. 3 and 4, FIGS. 5 and 6, FIGS. 7 and 8, and FIGS. 9 and 10 of the drawings may be employed as the burner 600 shown in FIG. 12. With reference to FIG. 12, a combustible gas mixture which typically includes more than 40% by volume of hydrogen sulphide flows into the burner 600. Partial combustion of the hydrogen sulphide is supported by the supply of oxygen enriched air and atmospheric air to the burner 600. The burner 600 fires into a furnace 602. A gas mixture comprising hydrogen sulphide, sulphur dioxide, sulphur vapor, water vapor, nitrogen, carbon dioxide and hydrogen leaves the furnace 602 typically in the range of 1100° C. to 1600° C. The effluent gas mixture passes through a waste heat boiler 604 in which its temperature is reduced to a little above the point at which sulphur vapor condenses. The mole ratio of hydrogen sulphide to sulphur dioxide in the effluent gas mixture is approximately 2 to 1 after some recombination of hydrogen and sulphur in the waste heat boiler 604.

Downstream of the waste heat boiler 604 the effluent gas flows through a condenser 606 in which sulphur vapor is condensed. The resulting condensate is passed for storage. The residual gas mixture flows from the condenser 606 through successive catalytic Claus stages 608, 610 and 612. Each of the stages 608, 610 and 612, in accordance with the general practice in the art, comprises a train of units consisting, in sequence, of a reheater (not shown) to raise the temperature of the gas mixture to a temperature suitable for catalytic reaction between hydrogen sulphide and sulphur dioxide, a catalytic reactor (not shown) in which hydrogen sulphide reacts with sulphur dioxide to form sulphur vapor and water vapor, and a sulphur condenser (not shown). If desired, depending on the environmental standards which the plant shown in FIG. 12, one or more of the catalytic stages 608, 610 and 612 may be omitted.

The gas mixture leaving the downstream catalytic stage 612 may be subjected to any one of a number of known treatments for rendering Claus process effluent more suitable for discharge to the atmosphere. For example the gas may pass to a reactor 614 in which it is subjected to hydrolysis and hydrogenation. Any residual carbon oxysulphide and carbon disulphide are hydrolysed over a catalyst by water vapor to produce hydrogen sulphide. This catalyst may be, for example, alumina impregnated with cobalt and molybdenum. Such catalysts are well known in the art. At the same time, residual elemental sulphur and sulphur dioxide are hydrogenated to form hydrogen sulphide. The hydrolysis and hydrogenation take place on the impregnated alumina catalyst at a temperature typically in the range of 300 to 350°

C. The resulting gas mixture consisting essentially of hydrogen sulphide, nitrogen, carbon dioxide, water vapor and hydrogen leaves the reactor 614 and flows first to a water condensation unit (not shown) and then to a separate unit (not shown) in which hydrogen sulphide is separated, for example, by chemical absorption/desorption. A suitable chemical absorbent is methyl diethylamine. If desired, the hydrogen sulphide thus recovered may be recycled to the burner 600.

What is claimed is:

1. A method of forming sulphur vapor by partial oxidation of hydrogen sulphide, comprising operating a burner to establish a flame in a furnace in or into which the burner fires, supplying to the flame from a first region of the mouth of the burner at least one flow of a first combustible gas comprising hydrogen sulphide and ammonia, causing at least one, second flow of a first oxidizing gas consisting of oxygen gas or oxygen-enriched air to issue from the mouth of the burner and mix in the flame with the first combustible gas, supplying to the flame from a second region of the mouth of the burner surrounding and spaced apart from said first region at least one, third flow of a second combustible gas consisting of hydrogen sulphide, wherein the mass flow rate of said first combustible gas and the mass flow rate of said second combustible gas to said burner are controlled independently of one another, causing at least one, fourth flow of a second oxidizing gas consisting of oxygen gas or oxygen-enriched air to issue from a region or regions of the mouth of the burner surrounded by said second region and mix in the flame with the second combustible gas, causing at least one, fifth, outermost flow of a third oxidizing gas to mix in the flame with the second combustible gas, and withdrawing from the furnace a resultant gas mixture including sulphur vapor, water vapor, sulphur dioxide, hydrogen and residual hydrogen sulphide.

2. A method as claimed in claim 1, in which the composition of the first combustible gas is varied.

3. A method as claimed in claim 1, in which the first combustible gas comprises sour water stripper gas or a mixture of sour water stripper gas and amine gas.

4. A method as claimed in claim 3, in which the proportions of sour water stripper gas and amine gas in the first combustible gas are varied.

5. A method as claimed in claim 1, in which the mass flow rate of the first oxidizing gas and the mass flow rate of the second oxidizing gas to the burner are controlled independently of one another.

6. A method as claimed in claim 1, in which mixing of the first combustible gas with the first oxidizing gas is facilitated by directing at least some of the first oxidizing gas along a path or paths which meet a path or paths followed by the first combustible gas.

7. A method as claimed in claim 1, in which mixing of the first combustible gas with the first oxidizing gas is facilitated by directing at least some of the first oxidizing gas at a first linear velocity along a path or paths extending generally contiguous and generally parallel to a path or paths followed by the first combustible gas at a second linear velocity, and one of the first and second linear velocities is from 25 to 150% greater than the other thereof.

8. A method as claimed in claim 7, in which the first linear velocity is greater than the second linear velocity.

9. A method as claimed in claim 1, in which mixing of the first combustible gas with the first oxidizing gas is facilitated by imparting a swirling motion to one or both thereof.

10. A method as claimed in claim 1, in which the third oxidizing gas is atmospheric air.

* * * * *